United States Patent [19]

Verstraelen et al.

[11] 3,786,489

[45] Jan. 15, 1974

[54] CODE TRANSLATOR

[75] Inventors: Robrecht H. K. Verstraelen; Luciaan H. E. Van Heddegem, both of Edegem, Belgium

[73] Assignee: International Standard Electric Corporation, New York, N.Y.

[22] Filed: Mar. 3, 1972

[21] Appl. No.: 231,561

[30] Foreign Application Priority Data

Mar. 9, 1971 Netherlands ....................... 7103152

[52] U.S. Cl. ....... 340/347 DD, 340/166 C, 235/155

[51] Int. Cl. ............................................ H04l 3/00

[58] Field of Search ................. 340/347 DD, 166 C, 340/174.1 B, 174 PC, 174 M; 235/155

[56] References Cited

UNITED STATES PATENTS

| | | | |
|---|---|---|---|
| 3,098,222 | 7/1963 | Freedman | 340/347 DD |
| 3,646,550 | 2/1972 | Aanacker | 340/347 DD |
| 3,340,403 | 9/1967 | Wetmore | 340/347 DD |
| 3,130,398 | 4/1964 | Freedman | 340/347 DD |
| 3,685,044 | 8/1972 | Vom Heddegen | 340/347 DD |

*Primary Examiner*—Maynard R. Wilbur
*Assistant Examiner*—Jeremiah Glassman
*Attorney*—C. Cornell Remsen, Jr. et al.

[57] ABSTRACT

This invention provides an improved magnetic core matrix code translator wherein each core in the decoder section thereof covers two digital possibilities rather than a "unique" digit representation. Moreover, each of the code wires running through the decoder cores is divided at the output thereof into anywhere from 2 to 32 branch lines which are then run through the cores of a coder stage to form 1-out-of-32 possibilities. These lines each terminate in a transistor switch operated by a control circuit. Since each decoder core represents two possibilities, selection of but one transistor switch is required, and is effected by the control in response to a gated output determined by the "control" bits of each code element.

6 Claims, 3 Drawing Figures

CODE TRANSLATOR

BACKGROUND OF THE DISCLOSURE

The present invention relates to a code translator including a decoder matrix of first magnetic cores with write windings, a coder matrix of second magnetic cores with read windings, a plurality of code wires threaded through sets of first and second magnetic cores of said decoder and coder matrices, and control means to feed input signals representative of input symbols to said write windings and to collect output signals from said read windings.

Such a code translator is already known in the art, e.g. from copending U. S. Pat. application Ser. No. 94,470, filed Dec. 12, 1970, now U. S. Pat. No. 3,685,044. In this known code translator the control means are adapted to feed an input signal representative of a single input symbol, e.g. one of the digits zero to nine, to the write winding of each of the first magnetic cores so that when the number of input symbols is high the number of first magnetic cores is also high. Consequently the decoder matrix is expensive.

SUMMARY OF THE INVENTION

An object of the present invention is therefore to provide a code translator of the above type which for performing a same code translation requires less first magnetic cores than the above mentioned known one.

The present code translator is particularly characterized in that said control means are adapted to feed input signals representative of a plurality of input symbols to the write winding of at least one of said first magnetic cores which is thus representative of this plurality of input symbols and to operate selection means controlling all of said code wires and that each code wire is representative of one of the possible combinations of the symbols represented by the first magnetic cores of the set through which said code wire is threaded, the number of symbols of each combination being equal to the number of first magnetic cores of said set and one symbol being provided per core of the set, and said code wire being controlled by a selection means provided at least for said one combination of symbols of which the code wire is representative.

Another characteristic of the present code translator is that each of said code wires has a first and a second branch threaded through sets of first and second magnetic cores respectively, at least two of the code wires threaded through a same set of first magnetic cores having a common first branch connected via a corresponding diode rectifier to each second branch of said two code wires and each second branch being controlled by a corresponding one of said selection means.

The present code translator is advantageous over the above mentioned known code translator due to the fact that it requires less first magnetic cores, less code wires and less control circuits to control the write windings of the first magnetic cores, notwithstanding the fact that the control means include additional selection means. Thus, it should be noted that not only equipment is saved but that also time is gained due to less code wires having to be threaded through the first magnetic cores.

In a preferred embodiment of the invention the present code translator is adapted to translate a five element alphanumerical code into a five-out-of-12 code.

This necessitates first of all a decoding of each of the five elements into a 1-out-of-32 code. The decoder matrix (FIG. 1) used therefore has five rows each with only 16, and not 32, first magnetic cores to the write windings of each of which the control means are adapted to feed an input signal representative of two, instead of one, alpha-numerical input symbols among 32 such symbols. The coder matrix (FIG. 2) has eight rows each of which includes 12 second magnetic cores and is associated to a corresponding one of eight programs, the control means being adapted to collect output signals from the read windings of these second magnetic cores. Each of the code wires has a first branch threaded through the decoder matrix, each code wire being grounded at one end and connected at its other end to the one ends of at most 32 second branches threaded through the coder matrix via corresponding diode rectifiers. The other ends of these second branches are each connected to the collector of a corresponding one of 32 selection transistors the bases of which are controlled by the control means and the emitters of which are grounded.

The present invention also relates to a code translator including a decoder matrix having $m$ rows each with a plurality of first magnetic cores provided with write windings, a coder matrix of second magnetic cores with read windings, a plurality of code wires threaded through sets of first and second magnetic cores of said decoder and coder matrices, and control means to feed an input signal representative of an input symbol to the write winding of a corresponding one of the first magnetic cores of each row and to collect output signals from said read windings.

The present code translator is characterized in that in order to make the translation possible of an $m+1$-element input code wherein each element represents any of $n$ input symbols said control means are adapted to operate $n$ selection means controlling all of said code wires, a selection means being provided for each of the $n$ input symbols and that each code wire is representative of one of the possible combinations of the symbols represented by the first magnetic cores of the set through which said code wire is threaded and of one of said $n$ input symbols, said code wire being controlled by said selection means provided for said one input symbol.

Such a code translator is also known from the above mentioned copending U.S. Patent application.

An object of the present invention is to provide a code translator of the last mentioned type which without the addition of magnetic cores is capable of translating an $m+1$-element input code.

BRIEF DESCRIPTION OF THE DRAWINGS

The above mentioned and other objects and features of the invention will become more apparent and the invention itself will be best understood by referring to the following description of an embodiment taken in conjunction with the accompanying drawings, in which.

DESCRIPTION OF THE PREFERRED EMBODIMENT

Figure 1:
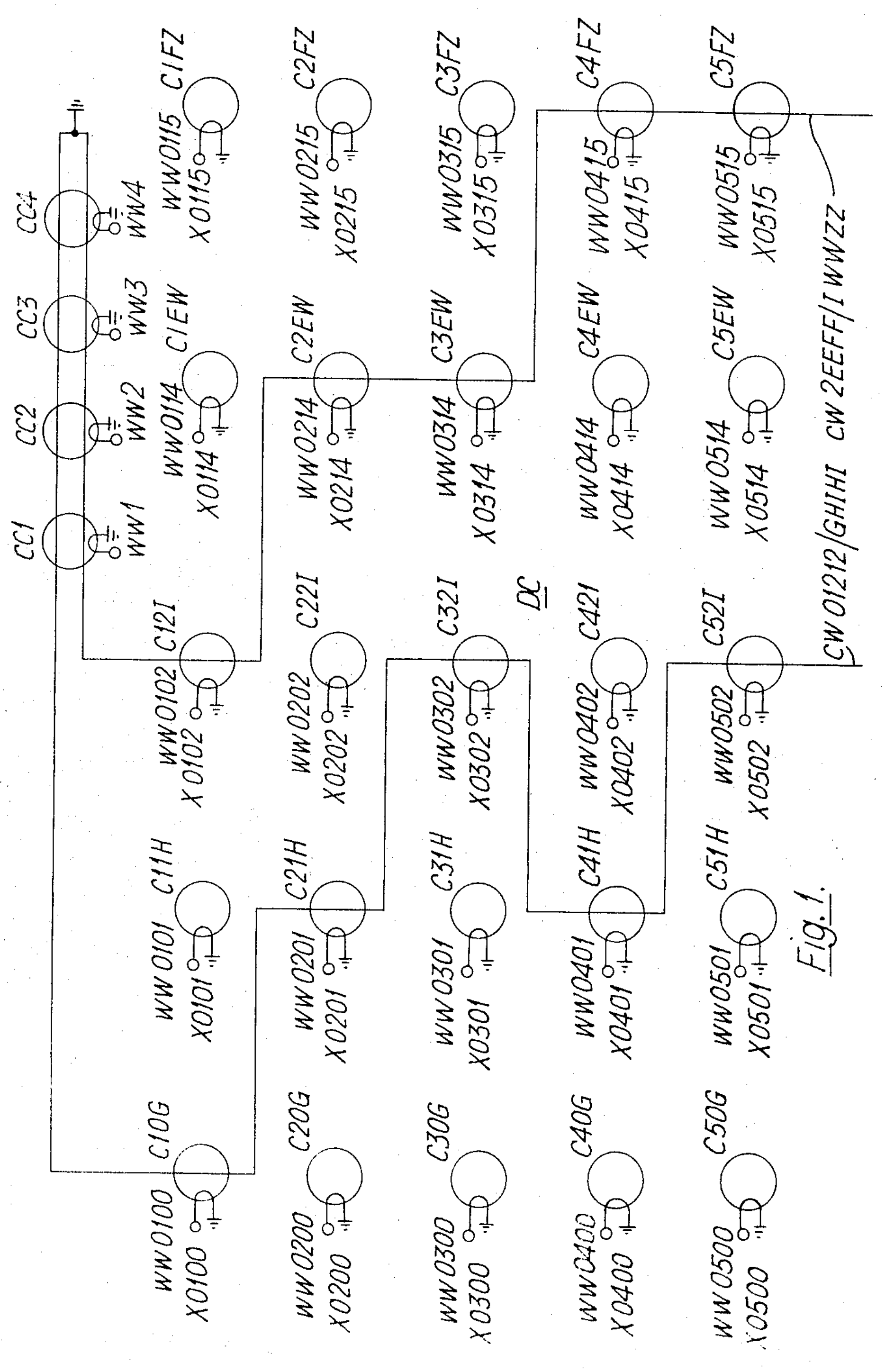
FIG. 1 is a schematic diagram of the decoder circuit of the code translator in accordance with the principles of the present invention.
Figure 2:
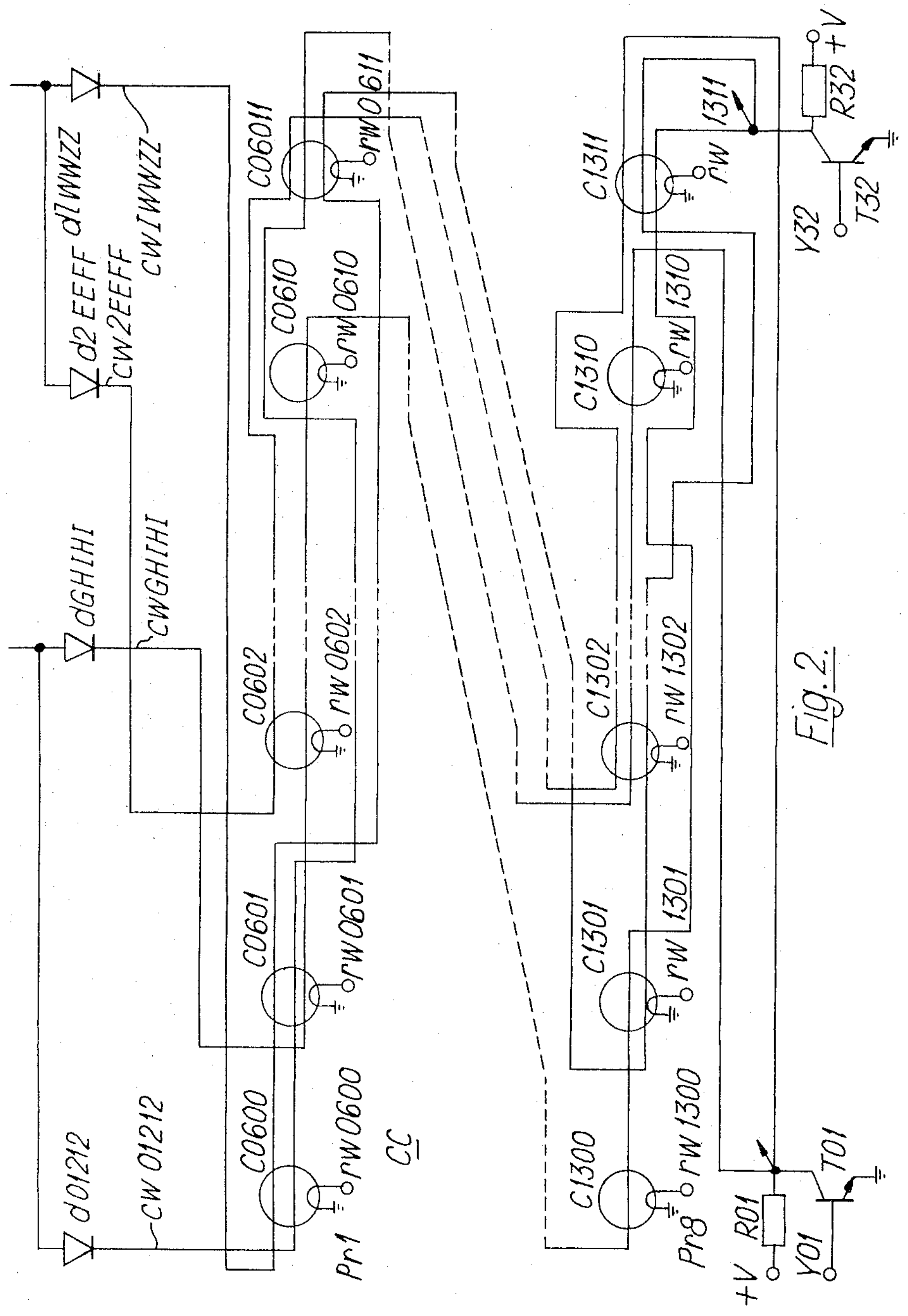
FIG. 2 is a schematic diagram of the coder circuit of the code translator in accordance with the principles of the present invention.
Figure 3:
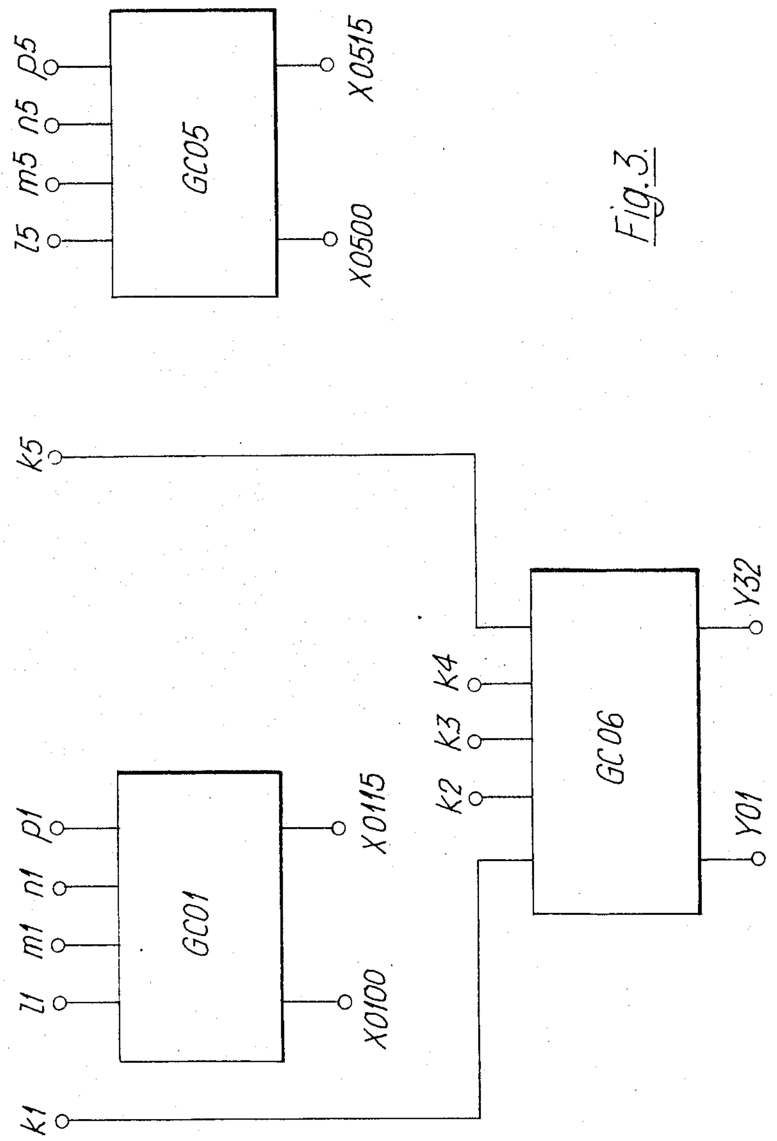
FIG. 3 is a block diagram of the control circuit of the code translator in accordance with the principles of the present invention.

Referring to these Figs. wherein FIG. 1 should be arranged above FIG. 2, the code translator shown therein is constituted by a decoder circuit DC (FIG. 1), a coder circuit CC (FIG. 2) and a control circuit or control means (FIG. 3) controlling the decoder and coder circuits.

The code translator forms part of an automatic letter sorter equipment and is adapted to translate five-element alpha-numerical index codes printed on letters into 200 destination codes according to eight different programs. More particularly, this code translator is adapted to first decode in the decoder circuit DC the index code in a 5 times 1-out-of-32 code and to subsequently translate the latter code in the coder circuit CC in a 5-out-of-12 code constituted by two 2-out-of-5 codes followed by a 1-out-of-2 code.

Each of the five elements of the alpha-numerical codes is coded in a 5-bit code and represents one out of 16 pairs of symbols O, G to F, Z. These 5-bit codes with bits *k*, *l*, *m*, *n* and *p* and the corresponding symbols are given in the following table from which it follows that the symbols O to F of the first group have the same bit $k = 0$, whereas the symbols G to Z of the second group have the same bit $k = 1$ and that the 16 pairs of symbols O, G; 1, H; . . . ; F, Z have the same bits *l*, *m*, *n* and *p* but different bits *k*.

| | k | l | m | n | p | | k | l | m | n | p |
|---|---|---|---|---|---|---|---|---|---|---|---|
| 0 | 0 | 0 | 0 | 0 | 0 | G | 1 | 0 | 0 | 0 | 0 |
| 1 | 0 | 0 | 0 | 0 | 1 | H | 1 | 0 | 0 | 0 | 1 |
| 2 | 0 | 0 | 0 | 1 | 0 | I | 1 | 0 | 0 | 1 | 0 |
| 3 | 0 | 0 | 0 | 1 | 1 | J | 1 | 0 | 0 | 1 | 1 |
| 4 | 0 | 0 | 1 | 0 | 0 | K | 1 | 0 | 1 | 0 | 0 |
| 5 | 0 | 0 | 1 | 0 | 1 | L | 1 | 0 | 1 | 0 | 1 |
| 6 | 0 | 0 | 1 | 1 | 0 | M | 1 | 0 | 1 | 1 | 0 |
| 7 | 0 | 0 | 1 | 1 | 1 | N | 1 | 0 | 1 | 1 | 1 |
| 8 | 0 | 1 | 0 | 0 | 0 | P | 1 | 1 | 0 | 0 | 0 |
| 9 | 0 | 1 | 0 | 0 | 1 | R | 1 | 1 | 0 | 0 | 1 |
| A | 0 | 1 | 0 | 1 | 0 | S | 1 | 1 | 0 | 1 | 0 |
| B | 0 | 1 | 0 | 1 | 1 | T | 1 | 1 | 0 | 1 | 1 |
| C | 0 | 1 | 1 | 0 | 1 | U | 1 | 1 | 1 | 0 | 0 |
| D | 0 | 1 | 1 | 0 | 1 | V | 1 | 1 | 1 | 0 | 1 |
| E | 0 | 1 | 1 | 1 | 0 | W | 1 | 1 | 1 | 1 | 0 |
| F | 0 | 1 | 1 | 1 | 1 | Z | 1 | 1 | 1 | 1 | 1 |

The decoder circuit DC includes four magnetic cores CC1 to CC4 hereinafter called compensating cores and 80 first magnetic cores C1OG to C5FZ arranged in a matrix having five rows each including 16 first magnetic cores, C1OG-C1FZ to C5OG-C5FZ respectively, and each provided for a corresponding one of the five elements of the index code to be decoded. Each of the compensating cores CC1 to CC4 is provided with a corresponding one of the write windings ww1 to ww4 each of which have one end grounded and the other end connected to a not shown part of the control circuit of FIG. 3. Each of the first magnetic cores C1OG to C5FZ is provided with a corresponding one of the write windings ww0100 to ww0515. These write windings are each indicated by the characters "ww" followed by a two-digit number indicating the row to which the magnetic core belongs and by a two-digit number indicating the rank of the core in this row. For instance, write winding ww0515 belongs to the first magnetic core of the fifth row and having rank 15 therein. Each of the write windings ww0100–ww0115 to ww0500–ww0515 is grounded at its one end and connected at its other end to a corresponding one of the output terminals X0100–X015 to X0500–X0515 of the gating circuits GC01 to GC05 forming part of the control circuit (FIG. 3) and having the input terminals l1, m1, n1, p1 to l5, m5, n5, p5 respectively.

These gating circuits GC01 to GC05 are obvious circuits adapted to translate the 4-bit codes formed by the bits l1, m1, n1, p1 to l5, m5, n5, p5 of the first to fifth elements of the index codes into 1-out-of-16 output codes when these bits are applied to the homologous input terminals of these gating circuits. Since the two symbols of each of the previously mentioned 16 pairs O,G to F,Z have the same 4-bit code constituted by the bits *l*, *m*, *n* and *p*, it is clear that when these bits of the two symbols are applied to the input terminals of one of the gating circuits GC01 to GC05 only a single one of the output terminals X0100–X0115 to X0500–X0515 thereof will be activated e.g. by a positive voltage pulse of magnitude E (not shown). Consequently the write winding of the first magnetic core connected to this output terminal will also be activated. In other words, the write winding of a first magnetic core is activated when the bits *l*,*m*,*n* and *p* of either one of the two symbols of a corresponding one of the 16 pairs are applied to one of the gating circuits GC01 to GC05. For this reason each first magnetic core may be considered as being representative of two symbols. For instance when the bits $l = O$, $m = O$, $n = O$ and $p = O$ of the symbols O and G are applied to the gating circuit GC01 an output signal appears at output terminal X0100 thereof due to which the write winding ww0100 of the first magnetic core C1OG is activated. The latter first magnetic core is hence representative of the pair of symbols O and G. This is the reason why each of the first magnetic cores is indicated by the capital character C followed by a digit indicating the row to which the magnetic core belongs and by the pair of symbols of which it is representative.

The coder circuit CC includes 96 second magnetic cores arranged in a matrix of eight rows each including 12 second magnetic cores C0600–C0611 to C1300–C1311 and each associated to a corresponding one of eight programs Pr1 to Pr8. Each of the second magnetic cores is indicated by the capital character C followed by a two-digit number indicating the row to which the second magnetic core belongs and by a two-digit number indicating the rank of the core in this row. For instance, the second magnetic core C1311 belongs to row 13 and has rank 11.

The second magnetic cores C0600 to C1311 are each provided with a corresponding one of the read windings rw0600 to rw1311 each having one end grounded and the other end connected to a program selection arrangement (not shown) forming part of the control circuit. This arrangement is of the type described in the above mentioned copending U. S. patent application and enables the activation of the read windings of any one of the eight rows corresponding to the programs Pr1 to Pr8.

It should be noted that all first and second magnetic cores have a linear hysteresis loop.

A plurality of code wires are each woven through the four compensating cores CC1 to CC4 and through the decoder and coder matrices. Each of these code wires has a first branch which is grounded at its one end and threaded through the four compensating cores CC1 to CC4 and the decoder matrix DC. Each of these first code wire branches is connected via respective diode rectifiers to at most 32 second branches which are threaded through the coder matrix CC and which are each connected at their other end to the collector of a distinct one of 32 transistors T01 to T32 the emitters of which are grounded. Thus, each first code wire branch is threaded through one first magnetic core of each of the rows of the decoder matrix, while each second code wire branch is woven through five second magnetic cores at the most of each of the eight rows of the coder matrix. More particularly in each of the latter eight rows each second code wire branch passes through two of the five second magnetic cores C0600–C0604 (not shown) to C1300–C1304 (not shown) through two of the five second magnetic cores C0605–C0609 (all not shown) to C1305–C1309 (all not shown) and finally through 1 of the 2 second magnetic cores C0610–C0611 to C1310–C1311.

It should be noted that the first branch of each of the code wires is indicated by the characters "cw" followed by the first and the last of the 32 possible combinations of the symbols represented by the first magnetic cores through which the first branch is threaded. For instance, the first code wire branch cw01212/GHIHI successively passes through the first magnetic cores C10G, C21H, C32I, C41H and C52I representative of the pairs of symbols O,G; 1,H; 2,I; 1,H and 2,I the first and last combinations of these symbols being 01212 and GHIHI respectively. Each of the 32 possible second code wire branches connected to a same first code wire branch is indicated by the characters "cw" followed by one of the 32 possible combinations of the symbols represented by the first magnetic cores through which the first code wire branch connected to this second code wire branch is woven. For instance, the code wire branch cw01212 is representative of the combination of symbols 01212. Each of the diode rectifiers is indicated by the character "d" followed by the same combination of symbols as the corresponding second code wire branch.

In FIG. 1 the first code wire branches cw01212/GHIHI and cw2EEFF/IWWZZ are shown. First code wire branch cw01212/GHIHI is connected to at most 32 second code wire branches such as cw01212 and cwGHIHI via the respective diode rectifiers d01212 and dGHIHI. The second code wire branches cw01212 and cwGHIHI are each threaded through five second magnetic cores at the most of each of the eight rows of the coder matrix. More particularly, - cw01212 is threaded through:

the second magnetic cores C0600, C0601, C0611 and two other not shown second magnetic cores;

the second magnetic cores C1302 and C1310 and three other not shown magnetic cores;

- cwGHIHI is threaded through :

the second magnetic cores C0601, C0602, C0610 and two other not shown second magnetic cores;

the second magnetic cores C1300, C1301, C1311 and two other not shown second magnetic cores.

First code wire branch cw2EEFF/IWWZZ is connected to at most 32 second code wire branches such as CW2EEFF and cwIWWZZ via the respective diode rectifiers d2EEFF and dIWWZZ. The second code wire branches cw2EEFF and cwIWWZZ are each threaded through five second magnetic cores at the most of each of the eight rows of the coder matrix. More particularly, -cw2EEFF is threaded through:

the two second magnetic cores C0602 and C0611 and three other not shown second magnetic cores;

the two second magnetic cores C1302 and C1311 and three other not shown second magnetic cores;

-cwIWWZZ is threaded through:

the three second magnetic cores C0600, C0601, C0611 and two other not shown second magnetic cores;

the three second magnetic cores C1301, C1302, C1311 and two other not shown second magnetic cores.

The control circuit of the transistors T01 to T32 is constituted by an obvious gating circuit GC06 with input terminals k1 to k5 and with output terminals Y01 to Y32 which are connected to the bases of the transistors T01 to T32 respectively. This gating circuit is adapted to translate the 5-bit code formed by the bits k1 to k5 of the first to fifth elements of an index code into a 1-out-of-32 output code appearing at the output terminals Y01 to Y32 as a positive output signal. One may hence say that the transistors T01 to T32 are each provided for a corresponding one of the 32 possible combinations of the bits k1 to k5. For instance transistors T01 and T32 are provided for the combinations 00000 and 11111 respectively.

As mentioned above the code wires are each representative of a combination of five symbols and hence of a combination of the bits k1 to k5 of these symbols. Therefore these code wires are each connected to the collector of the transistor provided for the corresponding combination. For instance code wire cw01212 which is representative of the combination of symbols 0, 1, 2, 1, 2 and hence of the combination 00000 of the bits k1 to k5 is connected to the collector of transistor T01; code wire cwGHIHI which is representative of the combination of symbols G, H, I, H, I and hence of the combination 11111 of the bits k1 to k5 is connected to the collector of transistor T32; code wires cs2EEFF and cwIWWZZ are representative of the combinations 00000 and 11111 respectively and are therefore connected to the collectors of the transistors T01 and T32 respectively.

In the above described decoder matrix a single first code wire branch is provided in common for a minimum of two and a maximum of 32 second code wire branches. Obviously the code wires may also be provided with separate first code wire branches threaded through a same set of first magnetic cores. This could however be a more expensive solution. Instead of providing for instance 32 code wires threaded through a same set of first magnetic cores and controlling each of these code wires by a separate transistor, it is also possible to provide less than 32 code wires, e.g. four, and to control each of these four code wires by eight distinct pairs of transistors, the transistors of each pair belonging to a first group of four transistors and to a second group of eight transistors respectively. This decreases the number of transistors but has the disadvantage that each code wire is controlled by two transistors.

In the code transistor described above each set of 32 symbols O to Z provided per row of the decoder matrix is subdivided into two equal groups O–F and G–Z characterized by the bits $k = 0$ and $k = 1$ respectively. Each first magnetic core is representative of two symbols each belonging to a different one of the two groups. A selection transistor is provided for each of the combinations of the *k* bits and hence for each of the combination of the various groups.

Instead of subdividing the set of symbols provided per row into two groups it may be subdivided in an arbitrary number of groups and the number of groups may also be different for the various rows of the decoder matrix. Also in this case selection transistors have to be provided and more particularly there must be one selection transistor for each of the combinations of the various groups of symbols provided for the various rows. The code wires representative of a combination of symbols must also each be connected to the collector of a selection transistor provided for the combination of the groups to which this combination of symbols belongs.

From the above it follows that there is no relation between the number of symbols provided per row and the number of rows of the decoder matrix although they are both equal to 32 in the above described embodiment.

The operation of the above described code translator is described hereinafter, it being supposed that the five-element index code read on a letter is 01212 or 00000/00001/00010/00001/00010
and that this code must be translated into a destination code according to programme Pr1.

The bits k1, l1, m1, n1, p1 (00000) to k5, l5, m5, n5, p5 (00010) of the index code are applied to the homologous input terminals of the gating circuits GC01 to GC06 of the control circuit.

In the same way as described in the above mentioned copending U. S. patent application, the latter control circuit applies a negative voltage pulse of magnitude E (not shown) to each of the write windings ww1 to ww4 of the compensating cores CC1 to CC4. Thus a resultant negative voltage pulse of magnitude 4E (not shown) is applied to each of the first code wire branches threaded through these magnetic cores and more particularly to the first code wire branch cw01212/GHIHI.

Due to the fact that the 4-bit code constituted by the bits l1, m1, n1, p1 of the first element of the index code is 0000 the output X0100 of the gating circuit GC01 is activated so that a positive voltage pulse with magnitude E (not shown) is applied to the write winding ww0100 of first magnetic core C1OG of the decoder matrix. Likewise, a positive voltage pulse with magnitude E is applied to the write windings ww0201, ww0302, ww0401 and ww0502 of the decoder matrix due to the 4-bit codes constituted by the bits l2, m2, n2, p2 to l5, m5, n5, p5 of the second to fifth elements of the index code read being 0001, 0010, 0001 an 0010 respectively.

A resultant positive writing pulse with magnitude E is hence applied to the first code wire branch cw01212/cwGHIHI via the activated write windings which are transformer coupled therewith. This first code wire branch is thus selected since the write pulse induces in the latter wire an input signal tending to make conductive the 32 diode rectifiers d01212 to dGHIHI. Finally only second code wire branch cw01212 is however selected since only transistor T01 is rendered conductive . Indeed, due to the fact that the combination of the bits k1 to k5 is 00000 only output terminal Y01 of gating circuit GC06 is activated.

Simultaneously with the occurrence of the above pulses the program selection circuit included in the control circuit enables the read windings coupled to the first row of second magnetic cores of the coder matrix to become operated, this row corresponding to the wanted first program Pr1. Consequently an output code may be collected at the read windings of the second magnetic cores of the first row of the coder matrix through which the second code wire branch cw01212 is threaded. This may happen in the same way as described in the above mentioned copending U. S. patent application.

It should be noted that a code translator similar to the above described one may also be used to decode a six-element index code first in a 1-out-of-16 code and then to translate the result into a 5-out-of-12 code. Indeed, therefore it is sufficient to control:

each of the five rows of the decoder matrix by a corresponding one of the five elements of the index code, each first magnetic core of each of these rows being now representative of a single one of 16 symbols;

the 16 transistors T01 to T16 by the sixth element of the index code and more particularly to control each transistor by a corresponding one of the 16 symbols.

By proceeding in this way, instead of using a decoder matrix with six rows of the type disclosed in the above mentioned copending U. S. patent application, a decoder matrix with five rows may be used.

While the principles of the invention have been described above in connection with specific apparatus, it is to be clearly understood that this description is made only by way of example and not as a limitation on the scope of the invention.

We claim:

1. Code translator including a decoder matrix of first magnetic cores with write windings, a coder matrix of second magnetic cores with read windings, a plurality of code wires threaded through sets of first and second magnetic cores of said decoder and coder matrices, and control means to feed input signals representative of input symbols to said write windings and to collect output signals from said read windings, characterized in that said control means (GC01-GC06) are adapted to feed input signals representative of a plurality of input symbols (O,G-F,Z) to the write winding (ww0100-ww0515) of at least one of said first magnetic cores (C10G-C5FZ) which is thus representative of this plurality of input symbols and to operate selection means (T01-T32) controlling all of said code wires (cw01212-cwGIGHI) and that each code wire is representative of one of the possible combinations of the symbols represented by the first magnetic cores of the set through which said code wire is threaded, the number of symbols of each combination being equal to the number of first magnetic cores of said set and one symbol being provided per core of the set, and said code wire being controlled by a selection means provided at least for said one combination of symbols of which the code wire is representative.

2. Code translator according to claim 1, characterized in that each of said code wires (cw01212/GHIHI) has a first and a second branch threaded through sets of first and second magnetic cores respectively, at least two of the code wires threaded through a same set of first magnetic cores having a common first branch (cw01212/GHIHI) connected via a corresponding diode rectifier (do1212-dGHIHI) to each second branch (cw01212-cwGHIHI) of said two code wires, and each second branch being controlled by a corresponding one of said selection means (T01-T32).

3. Code translator according to claim 1, characterized in that said decoder matrix has a plurality of rows of first magnetic cores (C1OG-C1FZ, C5OG-C5FZ), a plurality of groups of symbols (O-F, G-Z) being associated to each row in such a manner that the cores of each row are representative of a plurality of symbols belonging to different groups of those associated to the row, and that said selection means (T01-T32) are each provided for a corresponding combination among the possible combinations of the groups associated to said rows of said decoder matrix.

4. Code translator according to claim 3, characterized in that each said combination of symbols (01212, 2EEFF)of which a code wire (cw01212, cw2EEFF) is representative belongs to one of the combinations of said groups, each said code wire being controlled by the selection means provided for the combination of groups to which said combination of symbols belongs.

5. Code translator according to claims 2, characterized in that $p$ groups of symbols (O-F, G-Z) are associated to each of $m$ rows of said decoder matrix in such a manner that each first magnetic core is representative of $p$ symbols, each first code wire branch (cw01212/GHIHI) being connected to at most $p^m$ second code wire branches (cw01212-cwGHIHI) each via a said diode rectifier (d01212-dGHIHI) and that $p^m$ selection means (T01-T32) are provided.

6. Code translator including a decoder matrix having $m$ rows each with a plurality of first magnetic cores provided with write windings, a coder matrix of second magnetic cores with read windings, a plurality of code wires threaded through sets of first and second magnetic cores of said decoder matrices, and control means to feed an input signal representative of an input symbol to the write winding of a corresponding one of the first magnetic cores of each row and to collect output signals from said read windings, characterized in that in order to make the translation possible of an $m+1$-element input code wherein each element represents any of $n$ input symbols said control means are adapted to operate $n$ selection means controlling all of said code wires, a selection means being provided for each of the $n$ input symbols and that each code wire is representative of one of the possible combinations of the symbols represented by the first magnetic cores of the set through which said code wire is threaded and of one of said $n$ input symbols, said code wire being controlled by said selection means provided for said one input symbol.

* * * * *